No. 779,763. PATENTED JAN. 10, 1905.
G. H. BOYNTON.
MACHINE FOR CUTTING WARP FLOATS.
APPLICATION FILED AUG. 25, 1904.
4 SHEETS—SHEET 3.
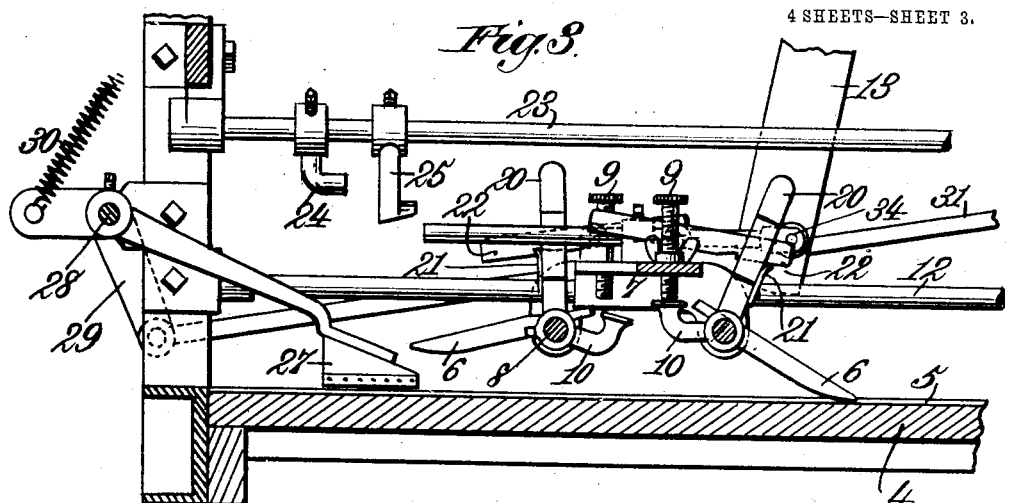
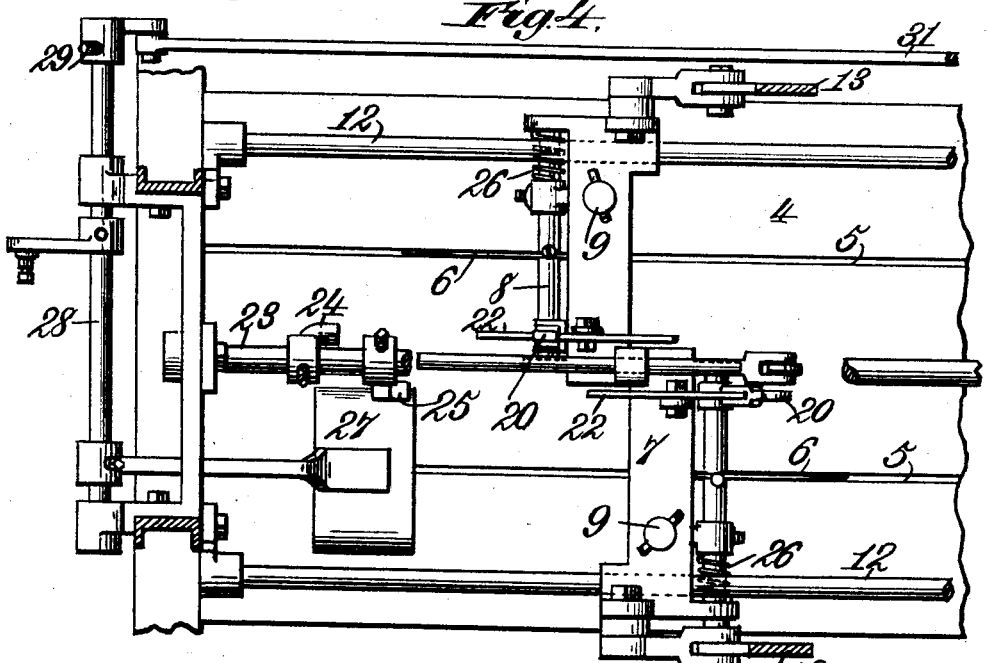
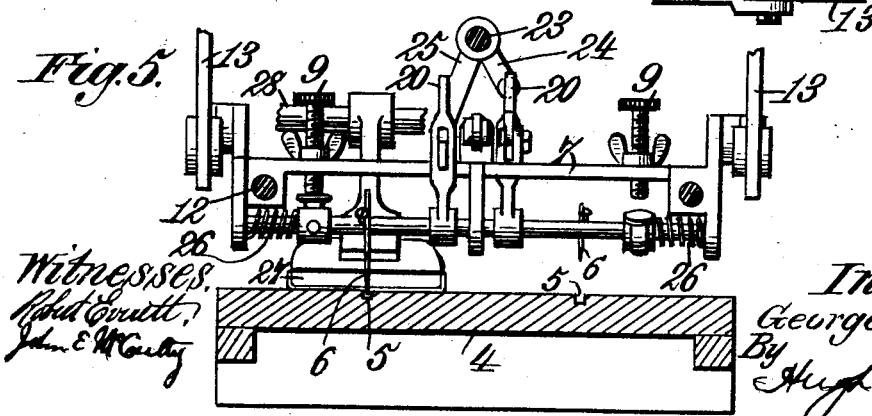
Witnesses.
Inventor,
George H. Boynton No. 779,763. PATENTED JAN. 10, 1905.
G. H. BOYNTON.
MACHINE FOR CUTTING WARP FLOATS.
APPLICATION FILED AUG. 25, 1904.

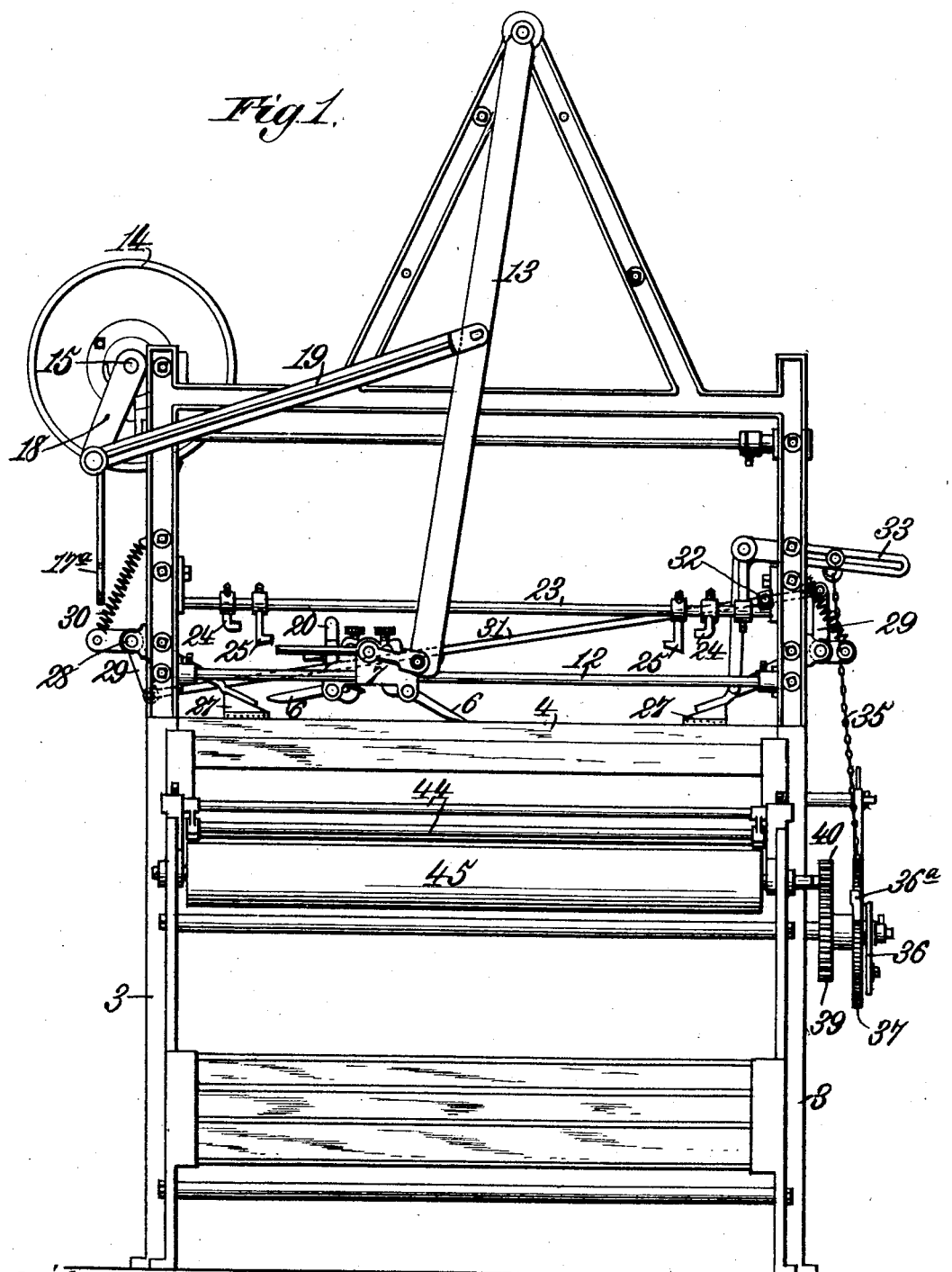

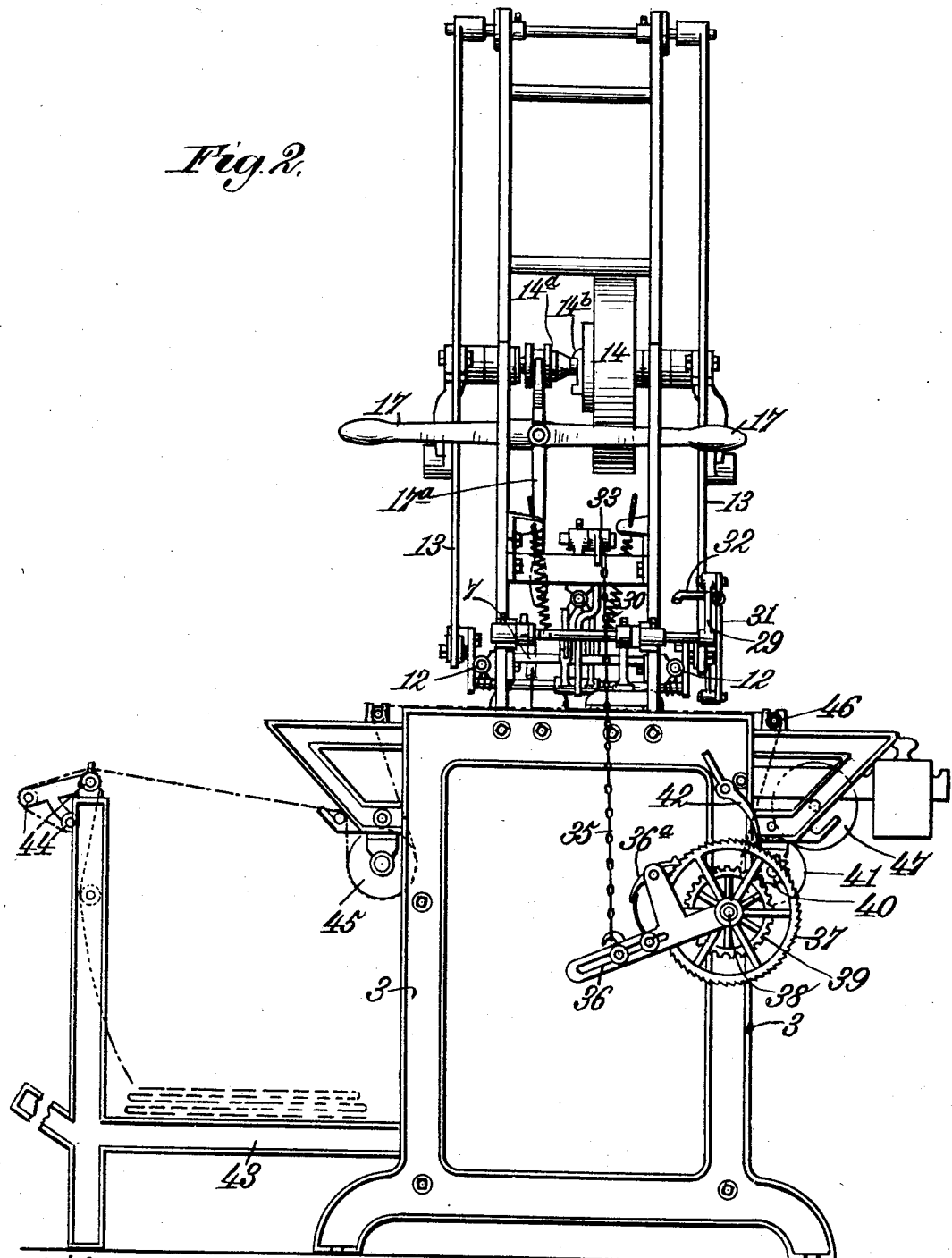

4 SHEETS—SHEET 4.

Witnesses.
Robert Everitt
John E. McCarty

Inventor.
George H. Boynton.
By Hugh C. Dysdale
Atty.

No. 779,763. Patented January 10, 1905.

UNITED STATES PATENT OFFICE.

GEORGE H. BOYNTON, OF NORTH ADAMS, MASSACHUSETTS.

MACHINE FOR CUTTING WARP-FLOATS.

SPECIFICATION forming part of Letters Patent No. 779,763, dated January 10, 1905.

Application filed August 25, 1904. Serial No. 222,100.

*To all whom it may concern:*

Be it known that I, GEORGE H. BOYNTON, a citizen of the United States of America, residing at North Adams, Berkshire county, Massachusetts, have invented certain new and useful Improvements in Machines for Cutting Warp-Floats, of which the following is a specification.

This invention relates to improvements in machines for cutting warp-floats, and has for its object to provide a machine for accomplishing this work in a rapid and efficient manner without injury to the cloth.

This invention resides in the machine hereinafter described and will be best understood from the following description.

That which is regarded as new will be set forth in the clauses of the claim appended to the description.

Figure 6:
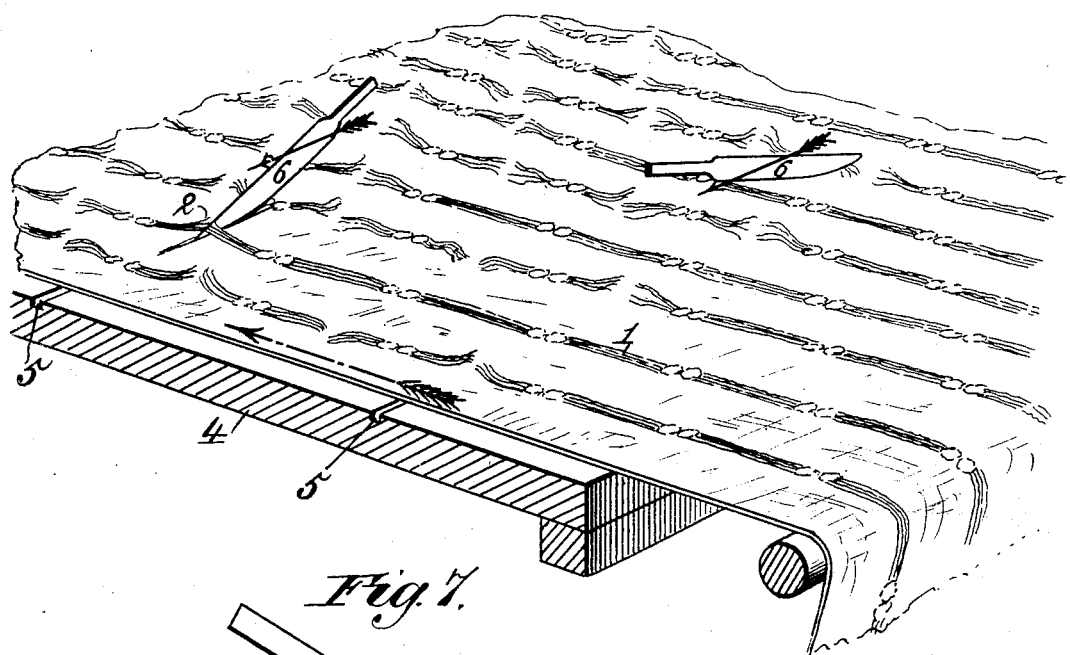
Figure 7:
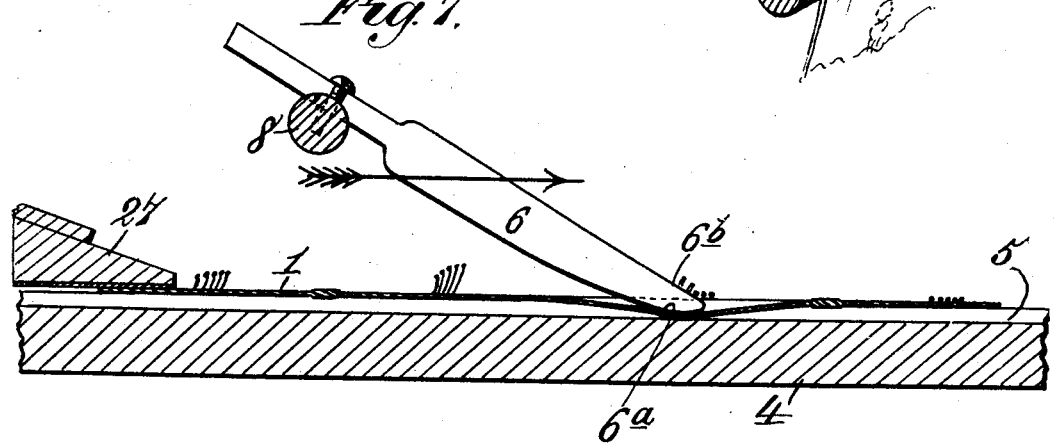
Figure 8:
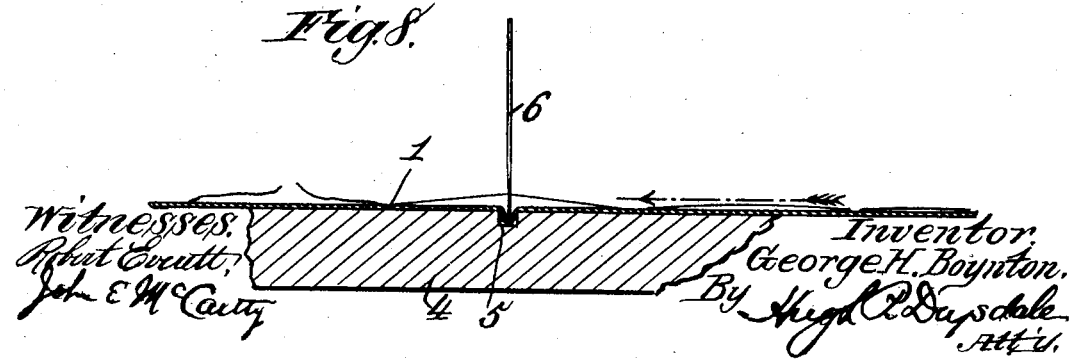

In the accompanying drawings, illustrating a machine embodying my invention, Figure 1 is a front elevation; Fig. 2, a side elevation; Fig. 3, an enlarged detail showing the float-cutting knives and adjacent coöperating mechanism. Fig. 4 is a top plan view of the parts shown in Fig. 3. Fig. 5 is a detail elevation illustrating said parts. Fig. 6 is a perspective view illustrating graphically the work performed by the machine. Fig. 7 is an enlarged detail of a float-cutting knife, illustrating the operation thereof. Fig. 8 shows the knife in an enlarged view illustrating the operation of pressing the cloth into a groove in the table to cause the warp-floats to stand out in proper position to be cut by the knife.

In goods for fancy shirtings and dresses the ornamentation is generally produced by a process which leaves on the rear face of the goods what are known as "warp-floats," designated in Fig. 6 of the drawings by reference-numeral 1. These warp-floats are severed in the manner illustrated at 2 in Fig. 6, and the loose ends of the warp-floats are then cut off or sheared off close to the fabric in a shearing-machine. Generally the warp-floats have heretofore been cut by hand, and so far as I am aware no satisfactory mechanism for automatically accomplishing this work has been provided.

The machine of my invention comprises suitable standards 3, which support the operative elements of the mechanism. A table 4, supported by said standards, is provided with a knife-race 5, in the preferred construction two of such races being provided for the accommodation of two knives.

The numeral 6 designates the warp-cutting knives, arranged to travel in the knife-races in the manner shown in Fig. 7 of the drawings, said knives each having a non-cutting lower edge $6^a$, which serve as shoes to press the body of the fabric down into the knife-races, as best shown in Fig. 7 and 8 of the drawings, causing the warp-floats to stand out clear of the body of the fabric to facilitate cutting the same. This operation is clearly illustrated in said Fig. 7 of the drawings. The forward or upper edges $6^b$ of the knives are cutting edges which engage and sever the warp-floats in the manner best shown in Fig. 6. The knives are reciprocated or caused to move across the fabric in the knife-races by suitable means, one example thereof being illustrated in the accompanying drawings. According to the illustrated example the knives are pivoted in a knife head or carrier 7, being arranged upon rock-shafts 8, mounted in said knife head or carrier, whereby the knives may be lowered into their respective races during their active reciprocation or movement and lifted out of operative position on the return or non-active stroke.

The numerals 9 designate adjusting-screws, with which arms 10, carried by the rock-shafts 8, come into contact, and thus govern the position of the knives in their active strokes. By manipulating the adjusting devices the position of the knives may be adjusted with nicety.

The knife head or carrier is mounted for reciprocation upon the rods 12, arranged above the table 4, and the knives are supported in said knife-carrier in alinement with the knife-races in the table. The knife-carrier, as shown, is caused to reciprocate upon said rods by means of arms 13, secured thereto at one end and pivotally supported upon the framework of the machine at its other end. This arm is caused to swing by means connected thereto and actuated by a driving-pulley driven by any suitable sort of power. This driving-pulley 14 is fast upon a shaft 15, upon which shaft is arranged a clutch member 14ª, adapted to be shifted into and out of engagement with a clutch member 14ᵇ, connected to the driving-pulley.

The numerals 17 and 17ª designate shipping-levers for shipping clutch member 14ª into and out of engagement with the clutch member 14ᵇ, whereby the action of the machine may be started and stopped at pleasure or according to necessity. Motion is transmitted from the pulley through the clutch members and a crank 18, connected to the swinging arms 13 by means of pitmen 19, whereby said arms are caused to swing and reciprocate the knife-carrier and the knives connected therewith.

It is designed, as above explained, that the knives shall during the active stroke be lowered into the knife-races for the purpose of pressing the goods down into the said races and causing the warp-floats to stand out clear from the body of the fabric to facilitate the cutting thereof and be lifted out of operative position on the return or inactive stroke. This is accomplished in the machine illustrated in the following manner, as best shown in Fig. 3 of the drawings. The rock-shafts on which the knives are mounted are provided with arms 20, carrying latches 21, adapted to engage keepers 22, carried by the knife-head 7. Mounted, for example, upon the rods 23 in the path of movement of the arms 20 are trips 24, with which said arms engage at the end of the active stroke of the knives, causing the shafts 8 to rock and lift the knives out of operative position, as illustrated in connection with the left-hand knife shown in Fig. 3 of the drawings, whereupon the latches 21 engage their respective keepers 22, whereby the knives are held up during the non-active stroke. At the end of the non-active stroke the tail end of each keeper 22 engages the cam-face of a corresponding latch-releaser 25, arranged on the rods 23, causing the keepers to disengage the latches, whereupon, as illustrated in connection with the knife at the right hand, Fig. 3, said knives may drop by gravity and their active ends fall into the appropriate knife-race; but preferably the knives are caused to move positively into operative position by means of suitable springs 26, Fig. 5.

I have illustrated my invention in a machine embodying two knives alternately arranged, as shown; but it will be understood that I do not restrict myself to a two-knife machine. Such a machine is preferable in respect to speed in that, as shown in the drawings, there is no idle stroke or reciprocation of the knife-carrier. I claim the plurality-knife machine, but in its broader aspect my invention is not limited thereto.

To hold the goods firmly in a smooth condition during the warp-float-cutting operation I provide gripping mechanism consisting, for example, of gripper members 27, mounted upon rock-shafts 28, arranged in suitable brackets in the machine-frame. Arranged on said rock-shafts are two-armed levers 29, to one arm of each of which is connected a spring 30, that serve to hold the grippers in firm contact with the fabric. The other arms of the levers 29 are connected by a link 31, and said link is provided with a lug 32, with which one of the swinging arms 13 come into contact at or about the end of the stroke in one direction, causing the rock-shafts 28 to partially rotate and lift the grippers from engagement with the fabric to enable the latter to be fed to bring a new line or lines of warp-floats in position to be severed. Immediately the fabric is released by the grippers it is automatically fed forward by suitable means—such, for example, as that illustrated in the drawings—in the following manner: Mounted in the framework of the machine is a rock-lever 33, one arm of which projects in the path of movement of a striker 34, mounted on the knife-carrier, and the other arm of which is attached by an adjustable connection 35 to a lever 36, carrying a dog 36ª, adapted to engage a ratchet 37, mounted upon a shaft 38, provided with a gear 39, meshing with a gear 40 on the shaft of the fabric-feed roll 41, whereby said roll is caused to rotate and feed the fabric forward in the machine. A pawl 42 is provided to prevent movement of the ratchet 37 in the reverse direction. It will be observed that at or immediately before the end of the stroke of the knife-carrier in one direction the striker will engage the rock-lever 33 and cause the dog 36 to actuate the ratchet 37 and through the medium of the gearing before referred to cause the feed-roll to feed the fabric. The stroke of the pawl may be adjusted to accord with the distance between the lines of warp-floats to be operated upon. This adjustability is secured in the machine illustrated by varying the point of attachment of the connection 35 with the levers 33 and 36.

In practice the fabric is arranged upon a platform 43 in folds and is trained through the machine over suitable tension-rolls 44 and a sand-roll 45 at the entrance end, across the supporting-table 4, over suitable tension-roll 46, thence around the feed-roll 40, and onto the take-up roll 47. An automatic intermittent feed is imparted to the fabric, as before described, separated by intervals of rest during which the knives press the fabric down into the knife-races and cut the warp-floats. In Fig. 6 the operation is graphically illustrated. In this illustration the knives are alternately arranged in respect to the direction of their active strokes and each knife is positioned to cut alternate rows of warp-loops. This arrangement is illustrative merely and may be varied without departing from my invention. As above stated, my invention in its broader aspect is not limited to a plurality-knife machine.

By my invention I provide a machine for cutting warp-loops comprising a new and advantageous mode of operation effected by a novel combination, arrangement, and construction of parts which serves in an efficient and safe manner to cut the warp-loops without injury to the goods.

It will be understood that my invention is not limited to the details of the various mechanisms illustrated in the drawings, as various modifications as to construction, arrangement, and mode of operation may be made therein without departing from my invention, the scope of which is stated in the following clauses of claim.

Having thus described my invention, what I claim is—

1. In a machine for cutting warp-floats, the combination with a fabric-support provided with a knife-race, of a knife provided with a shoe for pressing the fabric into the knife-race and a cutting edge for severing the warp-floats, and means for moving the knife across the fabric to cut said floats.

2. In a machine for cutting warp-floats, the combination with a fabric-support provided with a knife-race, of means for holding the fabric upon the support in proper position to be operated upon, a knife provided with a shoe for pressing the fabric into the knife-race and a cutting edge for severing the warp-floats, and means to move the said knife across the fabric to cut said floats.

3. In a machine for cutting warp-floats, the combination with a fabric-support provided with a knife-race, of a knife provided with a shoe for pressing the fabric into the knife-race, and a cutting edge for severing the warp-floats, means for moving the knife across the fabric to sever the warp-floats, and means for feeding the fabric to present the warp-floats to the action of the knife.

4. In a machine for cutting warp-floats, the combination with a fabric-support provided with a knife-race, of a knife provided with a shoe for pressing the fabric into the knife-race and a cutting edge for severing the warp-floats, means for moving the knife across the fabric to sever the warp-floats, and means for intermittently feeding the fabric to present the warp-floats to the action of the knife.

5. In a machine for cutting warp-floats, the combination with a fabric-support provided with a knife-race, of a knife provided with a shoe for pressing the fabric into the knife-race and a cutting edge for severing the warp-floats, means for moving the knife across the fabric to sever the warp-floats, and means for automatically moving the knife out of operative position and maintaining it in such position during the return or non-active stroke.

6. In a machine for cutting warp-floats, the combination with a support provided with a knife-race, of a knife provided with a cutting edge for cutting the warp-floats, and a shoe for pressing the fabric into the knife-race, means for moving the knife across the fabric to cut the warp-floats, means for holding the fabric on the support, means for moving the knife into inoperative position and holding it in such position during its return or non-active stroke, means moving in unison with the knife for releasing the fabric from the holding means, and automatic mechanism actuated by means moving in unison with the knife for feeding the fabric to present the warp-floats to the action of the knife.

7. In a machine for cutting warp-floats, the combination of a support provided with a plurality of knife-races, of a plurality of knives provided with shoes for pressing the fabric into the knife-races and with cutting edges to sever the warp-floats, and means for moving said knives across the fabric to cut the warp-floats 8. In a machine for cutting warp-floats, the combination of a support provided with a plurality of knife-races, of a plurality of alternately-disposed knives, provided with shoes for pressing the fabric into the knife-races and with cutting edges to sever the warp-floats, and means for moving said knives across the fabric to cut the warp-floats.

9. In a machine for cutting warp-floats, the combination with a support provided with a plurality of knife-races, of a plurality of knives provided with shoes for pressing the fabric into the knife-races and cutting edges for cutting the warp-floats, means for moving the knives across the fabric to cut the warp-floats, and means for moving said knives out of operative position and maintaining them in such position on their return or non-active stroke.

10. In a machine for cutting warp-floats, the combination with a support provided with a plurality of knife-races, of a plurality of alternately-disposed knives provided with shoes for pressing the fabric into the knife-races and cutting edges for cutting the warp-floats, means for moving the knives across the fabric to cut the warp-floats, and means for moving said knives out of operative position and maintaining them in such position on their return or non-active stroke.

11. In a machine for cutting warp-floats, the combination with a fabric-support, of a plurality of knives provided with shoes for engaging the fabric and cutting edges for cutting the warp-floats, means for moving said knives across the fabric to cut the warp-floats and means for moving said knives out of operative position and holding them in such position during their return or non-active stroke.

12. In a machine for cutting warp-floats, the combination with a support, of a warp-float-cutting knife provided with a shoe for engaging the fabric and a cutting edge for cutting the warp-floats, means for moving said knife across the fabric to cut the warp-floats, means for moving said knife out of operative position and maintaining it in such position during its return or non-active stroke.

13. In a warp-float-cutting machine, the combination with a fabric-support, of a knife provided with a shoe for engaging the fabric and a warp-float-cutting edge, means for moving said knife across the fabric to cut the warp-floats, means for moving the said knife out of operative position and holding the same in this position during its return or non-active stroke, and means arranged to release the knife at the end of its non-active stroke to permit it to resume its operative position.

14. In a warp-float-cutting machine, the combination of a fabric-support, of a knife-carrier, a plurality of oppositely-disposed knives mounted in said carrier, means for moving said knife-carrier across the fabric, means for holding the fabric on the support, means for automatically releasing the fabric from the holding means, and means for automatically feeding the fabric intermittently to present the warp-floats to the action of the knives.

15. In a warp-float-cutting machine, the combination with a fabric-support, of a warp-float-cutting knife, provided with a shoe for engaging the fabric, and a cutting edge for cutting the warp-floats, means for moving said knife across the fabric to cut the warp-floats, means for moving said knife out of operative position and holding it in such position during its return or non-active stroke, and means for releasing the knife from said holding means.

16. In a machine for cutting warp-floats, the combination with a fabric-support, of grippers for holding the fabric on said support, means for automatically feeding the fabric across the support, a warp-float-cutting knife, and means moving in unison therewith for automatically releasing the fabric from the grippers and actuating the feed mechanism.

17. In a machine for cutting warp-floats, the combination with a fabric-support provided with a knife-race, of grippers for holding the fabric on the support, means for automatically feeding the fabric across the support, a knife provided with a shoe for pressing the fabric into the knife-race and a cutting edge for cutting the warp-float, and means operating at the end of the stroke of the knife for automatically releasing the fabric from the grippers and actuating the feed mechanism.

18. In a warp-float-cutting machine, the combination with a fabric-support, of grippers for holding the fabric on said support, means for feeding the fabric across said support, a plurality of oppositely-disposed knives for cutting the warp-floats, and means moving in unison with said knives for automatically releasing the fabric from the grippers and actuating the feed mechanism.

19. In a machine for cutting warp-floats, the combination with a fabric-support provided with a plurality of knife-races, of grippers for holding the fabric on the support, means for automatically feeding the fabric across the support, a plurality of oppositely-disposed knives for cutting the warp-floats said knives provided with shoes for pressing the fabric into the knife-races and cutting edges for cutting the warp-floats, and means moving in unison with said knives for releasing the fabric from the grippers and actuating the feed mechanism.

20. In a machine for cutting warp-floats, the combination with a fabric-support, of grippers for holding the fabric on the support, means for automatically feeding the fabric across the support, a knife for cutting the warp-floats, means for moving said knife across the fabric, means for moving said knife out of operative position and maintaining it in such position during its inactive stroke, and means moving in unison with said knife for automatically releasing the fabric from the grippers and actuating the feed mechanism.

21. In a machine for cutting warp-floats, the combination with a fabric-support, of grippers for holding the fabric on the support, means for automatically feeding the fabric across the support, knives for cutting the warp-floats, means for moving said knives across the fabric, means for moving said knives out of operative position and maintaining them in such position during their inactive strokes, and means moving in unison with said knives for automatically releasing the fabric from the grippers and actuating the feed mechanism.

22. In a warp-float-cutting machine, the combination with a fabric-support, of a fabric-cutting knife, provided with a shoe for engaging the fabric and a cutting edge for cutting the warp-floats, means for moving said knife across the fabric to cut the warp-floats, means arranged to move the knife away from the fabric at the end of its active stroke and hold it out of operative position during its non-active stroke, and means arranged to release the knife at the end of its non-active stroke to permit it to resume its operative position.

23. In a warp-float-cutting machine, the combination with a fabric-support, of a fabric-support provided with a knife-race, of a warp-float-cutting knife, provided with a shoe for engaging the fabric and a cutting edge for cutting the warp-floats, means for moving said knife in the race across the fabric to cut the warp-floats, means arranged to move the knife away from the fabric at the end of its active stroke and hold it out of operative position during its non-active stroke, means arranged to release the knife at the end of its non-active stroke and permit it to resume its operative position.

24. In a machine for cutting warp-floats, the combination with a fabric-support, of a plurality of alternately-disposed warp-float-cutting knives, means for moving said knives across the fabric to cut the warp-floats, means arranged to move the knives away from the fabric at the end of their active strokes and hold them out of operative position during their non-active strokes, and means arranged to release the knives at the end of their non-active strokes to permit them to resume their operative position.

25. In a warp-float-cutting machine, the combination with a fabric-support provided with a plurality of knife-races, of a plurality of oppositely-disposed warp-cutting knives, means for moving said knives in said races across the fabric to cut the warp-floats, means arranged to move the knives away from the fabric at the end of their active strokes and hold them out of operative position during their non-active strokes, and means arranged to release the knives at the end of their non-active strokes to permit them to resume their operative position.

In testimony whereof I have hereunto set my hand in presence of two subscribing witnesses.

GEORGE H. BOYNTON.

Witnesses:
JOHN E. McCARTHY,
CHARLES R. JUDEVINE.